United States Patent [19]

Briscoe

[11] 3,835,400

[45] Sept. 10, 1974

[54] SEQUENTIAL AUTOMATIC GAIN CONTROL CIRCUIT

[75] Inventor: William G. Briscoe, Huntsville, Ala.

[73] Assignee: The United States of America as represented by the Secretary of the Army, Washington, D.C.

[22] Filed: July 25, 1973

[21] Appl. No.: 382,628

[52] U.S. Cl. .......... 328/168, 307/235 A, 328/151, 328/172, 330/144

[51] Int. Cl. .......... H03k 5/18, H03g 3/20

[58] Field of Search... 307/235 A, 242, 237, 252 M, 307/294; 328/151, 152, 168, 169, 171, 172, 173; 330/144, 145

[56] References Cited

UNITED STATES PATENTS

| | | | |
|---|---|---|---|
| 3,037,158 | 5/1962 | Schmidt | 307/252 M X |
| 3,060,329 | 10/1962 | Harrison et al. | 307/235 A |
| 3,304,507 | 2/1967 | Weekes et al. | 328/151 |
| 3,415,950 | 12/1968 | Bartz et al. | 328/169 X |
| 3,535,550 | 10/1970 | Kang | 328/168 X |
| 3,555,298 | 1/1971 | Neelands | 328/151 X |
| 3,586,880 | 6/1971 | Fitzwater, Jr. | 328/151 X |
| 3,601,634 | 8/1971 | Ebertin | 328/172 X |
| 3,701,909 | 10/1972 | Holmes et al. | 328/151 X |
| 3,748,495 | 7/1973 | Messinger | 328/168 X |

*Primary Examiner*—Rudolph V. Rolinec
*Assistant Examiner*—L. N. Anagnos
*Attorney, Agent, or Firm*—Edward J. Kelly; Herbert Berl; Jack W. Voigt

[57] ABSTRACT

The sequential automatic gain control circuit is an improved AGC circuit that can be used in search and track radars which receive a series of pulse returns from each target. The sequential AGC is well suited for monopulse radars and moving target indication (MTI) processing where gain stability and gain match between channels are required. The maximum input signal levels are sensed by a pair of AGC circuits which alternately provide output levels for a predetermined time. The output signal levels are proportional to the maximum input signal received during the previous pulse return period.

2 Claims, 4 Drawing Figures

SEQUENTIAL AUTOMATIC GAIN CONTROL CIRCUIT

BACKGROUND OF THE INVENTION

Conventional feedback AGC and feed forward AGC circuits introduce distortion into the signal which degrades moving target indication performance and monopulse tracking accuracy. The feed forward AGC requires a delay line which is expensive and introduces time sidelobe distortion. If matched receiver channels are required as in monopulse receivers, the delay line will introduce phase match error. Critical timing of gain control action and signal delay makes the design of feed forward AGC circuits much more difficult than the sequential AGC circuit.

SUMMARY OF THE INVENTION

The sequential automatic gain control (AGC) circuit is an improved gain control circuit for search and track radars, such as a step scan phased array radar which receives a series of pulse returns from each target before the antenna beam is switched to a new target. The sequential AGC circuit senses the maximum received signal level from the first pulse return and determines the proper gain for the series of pulses transmitted after the first pulse. If only about a millisecond of time elapses between the first and last pulse transmitted, as in many modern state of the art radars, the maximum received signal level will be essentially constant during the series of pulses received and proper gain control will be maintained.

DESCRIPTION OF THE PREFERRED EMBODIMENT

Figure 1:
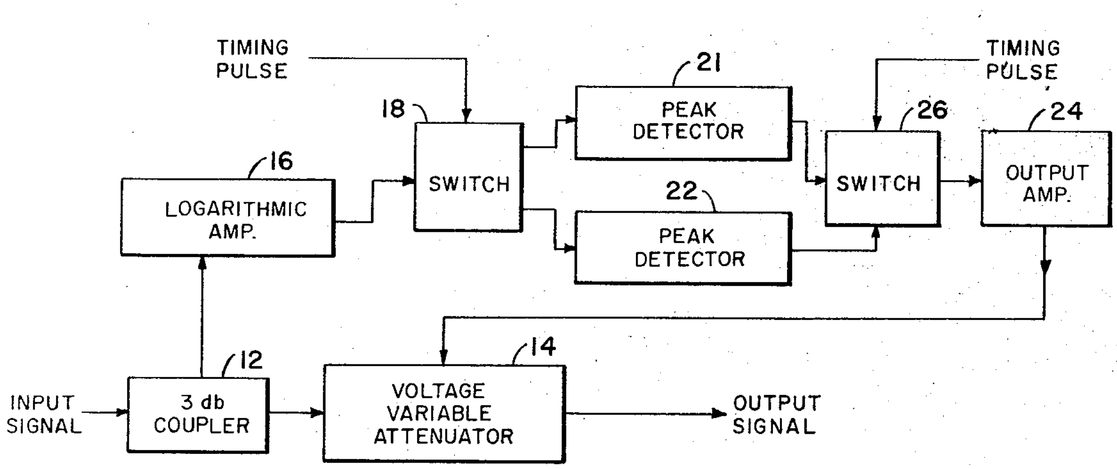
FIG. 1 is a simplified block diagram of a preferred embodiment of the sequential automatic gain control circuit.

A block diagram of the sequential AGC circuit is shown in FIG. 1. The circuit senses the maximum input signal during time intervals determined by timing pulses and provides output voltages to a voltage variable attenuator during later time intervals. Input energy reflected from a target is received by the radar antenna (not shown) and coupled to a coupler circuit 12. The coupler has outputs coupled to an attenuator 14 and to an amplifier 16. The logarithmic amplifier 16 provides a continuous output voltage proportional to the input signal level. An electronic switching circuit 18 responds to periodic timing pulses to switch the proportional output voltage of amplifier 16 to one of two peak detectors 21 and 22. The peak detectors detect the maximum input signal amplitude that occurs during a predetermined time interval and holds the peak detector output constant at the maximum input signal amplitude. When a succeeding input to the peak detector is less than a previous input signal level, the output does not change. When a succeeding input is larger than a previous input signal level, the output increases to the larger signal level. Two peak detectors are required so that one peak detector will always be sensing the maximum input signal level while the other peak detector has the output supplied to an output amplifier. The outputs from peak detectors 21 and 22 are coupled to respective inputs of an electronic switching circuit 26 which is periodically switched by a timing pulse simultaneously with the timing of switch 18 to couple one or the other detector to amplifier 24. Output amplifier 24 supplies a control voltage to the voltage variable attenuator 14. The output signal level of the sequential gain control circuit is adjusted to the desired level by the voltage variable attenuator and coupled to using circuitry.

Simply by changing the timing pulses supplied to switches 18 and 26, a number of different useful gain control characteristics are obtainable. In a target tracking radar, the peak detectors can be switched to alternately detect the maximum signal during only the time that signals are arriving from the range position of the target and the output of the peak detectors are routed to the voltage variable attenuator. If the radar is operating in search mode, one detector can detect the maximum received signal during a full range sweep, hold the output to the attenuator constant during the next range sweep, and at the same time the other detector detects a new maximum received signal. The control voltage to the attenuator can also be held constant for two, three, or more pulse periods for MTI processing.

Figure 2:
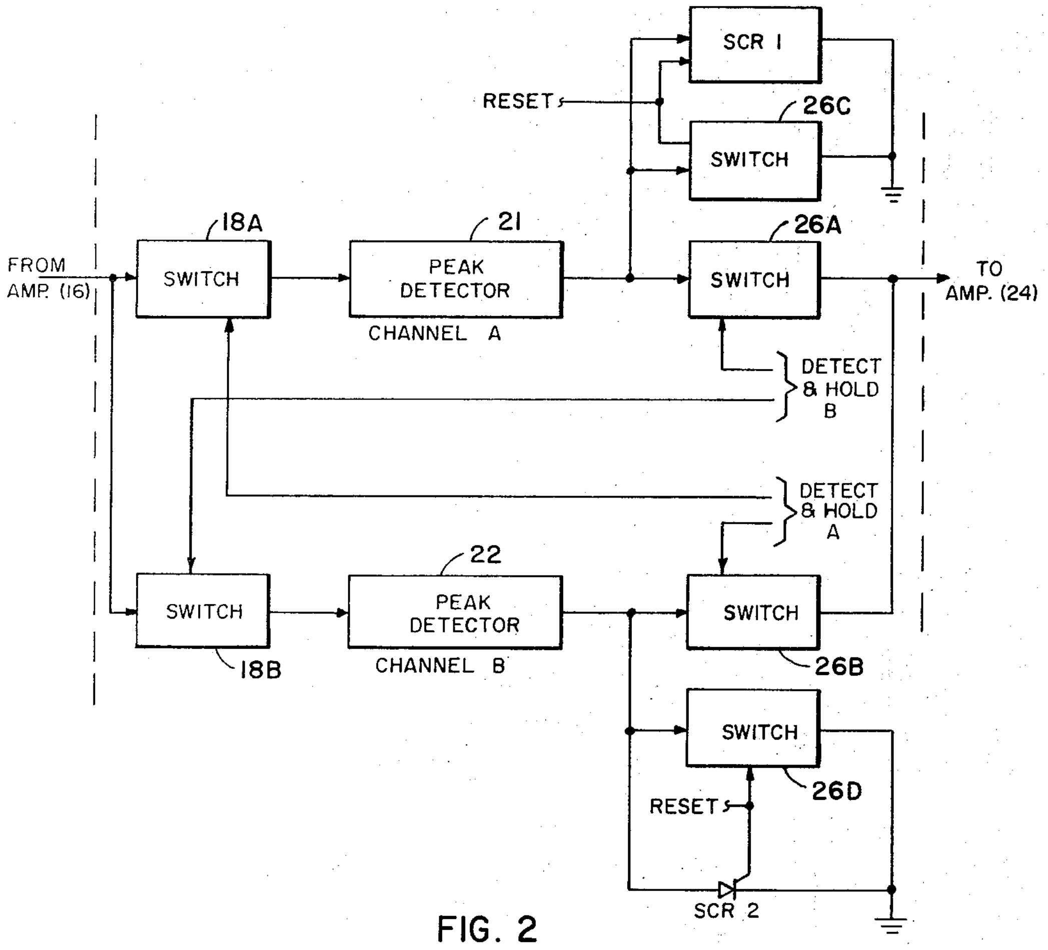
FIG. 2 is a more detailed block diagram of a switching and detector circuit for the sequential AGC circuit.

As shown in FIG. 2, the output signal from amplifier 16 is coupled through respective channels A and B to the input of amplifier 24. Input and output switching between channels A and B is accomplished by banks of electronic switches 18 and 26. Thus, for channel A the output signal from amplifier 16 is coupled through switch 18A and into peak detector 21 during the period that switch 18A is receiving a gating input signal. During this time switch 18B in channel B will be open and switch 26B will be activated by a gating input to provide a steady state output signal to amplifier 24 from peak detector 22. When the time period changes to detect and hold signal for channel B will provide a gating input to switch 18B, allowing input signal pulses to be coupled through the switch into peak detector 22 and simultaneously an output signal will be coupled from peak detector 21 of channel A through switch 26A to amplifier 24. Obviously, when switch 18A is gated on, switch 18B is gated off, allowing the respective channels to respond independently and alternately to respective input signal levels. Switches 26C and 26D are coupled between respective peak detector outputs and ground. Just prior to switching of the output signals from respective channels a reset gating input is coupled to switch 26C and 26D to remove that output signal level prior to receipt of any incoming signal pulses to the peak detectors. Silicon controlled rectifiers SCR 1 and SCR 2 are connected across respective switches 26C and 26D for enhancing the response time of these switches during reset operation.

Figure 3:
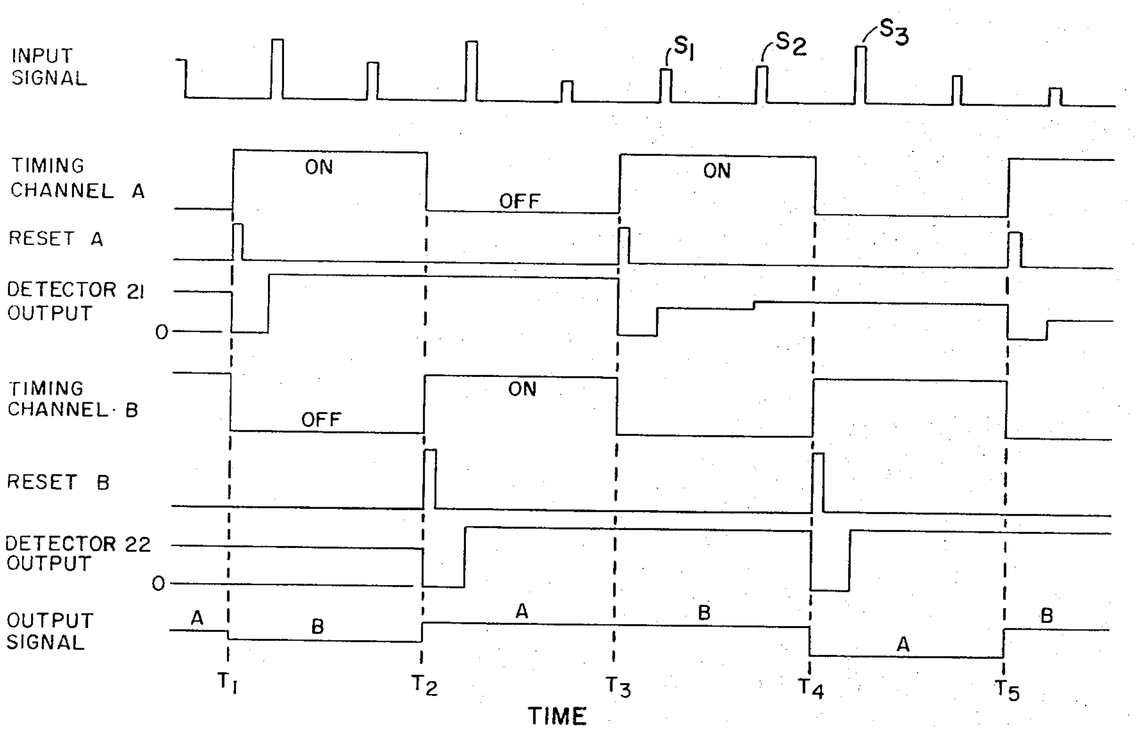
FIG. 3 is a signal flow diagram for the sequential AGC circuit employing the switching circuitry of FIG. 2.

The time domain response or signal flow diagram of the sequential automatic gain control circuit utilizing the switching circuit of FIG. 2 is shown in FIG. 3. Periodic pulses of input signal energy vary in intensity. Timing for channel A is gated on as channel B timing is gated off at time T1. Similarly, reset for channel A periodically occurs simultaneously with the gating on of the timing for channel A, and reset for channel B occurs simultaneously with the gating on of channel B timing. These gating signals which may be clocked input pulses determine the period of operation of each channel and can obviously be adjusted as desired. The timing input and reset for channel A occur substantially simultaneously, with the timing input providing a detect and hold function wherein switch 18A is gated on to allow peak detector 21 to detect incoming signals and switch 26B is activated to couple and hold the output of detector 22 as the output signal to amplifier 24. This is as shown in FIG. 3 in the time interval from T1 to T2. At T2 the timing input for channel A is terminated and a reset input for channel B occurs simultaneously with the activation of channel B timing so that channel A is no longer receiving input signals and channel B is now responsive to input pulses. During this period from T2 to T3, switch 26A is activated allowing detector 21 output to be coupled to the amplifier 24. Thus, a continuous output signal is coupled to amplifier 24 for providing an output signal to the load circuit for sequential gain control. During alternate time intervals the output signal level may vary or may be identical as between time intervals T2 and T4, depending on the amplitude of the energy received during the previous time period.

As shown in FIG. 3 the detector 21 is gated on to receive input pulses during time intervals T1–T2 and T3–T4, and is gated off for reading out a signal proportional to the input pulse received during time intervals T2–T3 and T4–T5. During the period from T3 to T4 input signal S2 has been assumed to be greater than the previous input S1. The detector 21 which has just been reset responds to S1 to provide an output signal proportional thereto which is then increased when the larger input signal S2 is received. The next input pulse S3 occurs after the timing for channel A is off and is picked up by peak detector 22 while peak detector 21 is being read out during the time interval from T4 to T5.

Figure 4:
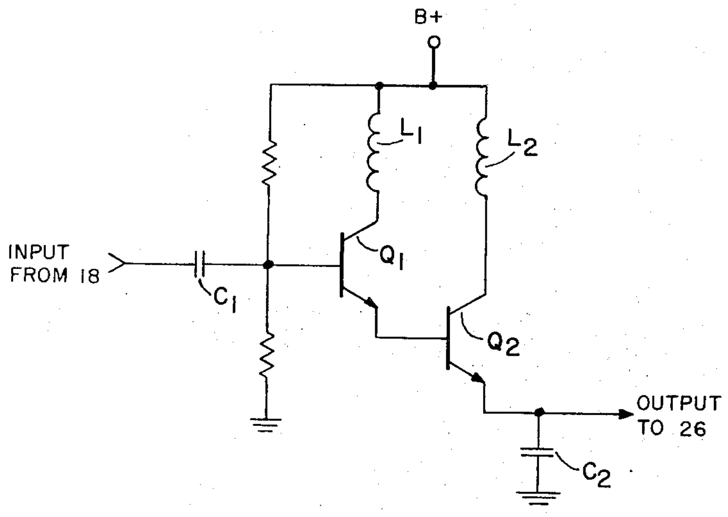
FIG. 4 is a schematic diagram of a peak detector circuit.

Peak detectors 21 and 22 provide output signals proportional to the input signal level. As shown in FIG. 4, the peak detector is a Darlington circuit which charges a capacitor. An input signal is capacitively coupled to the base of a transistor Q1. Q1 is activated and provides an output to the base of transistor Q2, which activates Q2. A charging path is then opened from a power source through an inductor L2 and Q2 to an output capacitor C2, charging C2 to a voltage level proportional to the peak of the input signal of Q1. When this output is called for by the switching circuit, it is coupled to the load providing a steady state output level Obviously the input and output time intervals available in a system of this type is limited only by the limitations of the individual components in the system and may be fast or slow as desired. Typically, for a 30 MHz pulse signal input, a DC voltage level may be changed every 600 microseconds, with the output level during any 600 microsecond time interval being determined by the maximum input signal level during the preceeding 600 microsecond period.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. An automatic gain control circuit comprising: first and second amplifiers each having an input and an output; first and second banks of switches coupled between the output of said first amplifier and the input of said second amplifier for coupling signals therebetween; first and second peak detectors coupled between said first and second banks of switches for providing parallel channels between the output of said first amplifier and the input of said second amplifier for alternately providing proportional output signals to said second amplifier; said first and second banks of switches are each comprised of first and second electronic switches for alternately coupling energy to and from respective peak detectors, said first and second electronic switches of said first bank being coupled between the input of respective peak detectors and the output of said first amplifier, said first and second electronic switches of said second bank being coupled between the output of respective peak detectors and the input of said second amplifier, and respective first and second electronic switches have timing inputs thereto for providing alternate detect and hold signals thereto; each of said peak detectors is a Darlington circuit having a base coupled input and an emitter coupled output connected to respective first and second switching banks, and a capacitor coupled to said emitter output for maintaining proportional output signals to said second amplifier; said second bank of switches further includes third and fourth electronic switches coupled respectively between the output of respective peak detectors and system ground for resetting said detectors at alternate intervals; first and second silicon controlled rectifiers coupled across respective third and fourth electronic switches for providing rapid switch recovery after reset, a reset input coupled to a cathode gate of respective silicon controlled rectifiers and to said third and fourth switches for providing a gating input signal thereto; and a gain means coupled to the output of said second amplifier for receiving a control signal therefrom.

2. An automatic gain control circuit as set forth in claim 1 wherein said gain means is a voltage variable attenuator having first and second inputs and an output, said first input being coupled in parallel with said first amplifier input for receiving input signals coupled thereto, said second input being coupled to the output of said second amplifier for receiving a controlled voltage signal therefrom, and said attenuator output providing a controlled output signal.

* * * * *